Patented Nov. 20, 1945

2,389,542

UNITED STATES PATENT OFFICE 2,389,542

FOUNDRY COMPOSITION

Arnold E. Pavlish and Chester Ronald Austin, Columbus, Ohio, assignors, by mesne assignments, to Peerpatco, Incorporated, Indiana, Pa., a corporation of Delaware No Drawing. Original application July 23, 1943, Serial No. 495,900. Divided and this application June 30, 1945, Serial No. 602,670

3 Claims. (Cl. 22—217)

Our application is a division of our co-pending application Serial No. 495,900 filed July 23, 1943, entitled Foundry composition, and the invention relates to compositions for use in foundries and the like.

Among the objects of our invention is the provision of a foundry composition, together with the art of preparing the same, which composition displays marked enhancement of green strength, controlled dry strength, improved permeance, and the like, all with a minimum of added operational steps; which composition is produced readily and in simple, inexpensive manner with the use of a minimum of inexpensive and easily handled ingredients readily available on the market, according to a practice in which the operational steps are in large measure automatic and which require but a minimum of skilled labor and a minimum of attendance on the part of the operator; which composition flows readily and is easily rammed about the pattern, which is free from mold-hardening and does not cake readily, which does not burn onto the casting, which collapses easily in interior sections following casting, which shakes out of the molding flask easily, and which displays a high degree of recovery after use, with substantial absence of lumpy particles, and which composition produces good, sound castings wherein are faithfully reproduced the exact details of the pattern and which are characterized by freedom from cracks, checks or other surface defects.

Other objects will in part be obvious and in part pointed out hereinafter.

Our invention accordingly consists in the combination of elements, mixture of materials, and composition of ingredients, and in the several operational steps, and in the relation of each of the same to one or more of the others, all as described herein, the scope of the application of which is indicated in the following claims.

It is advantageous at this point, to facilitate more thorough comprehension of our invention, to note that it has heretofore been common practice, in the casting of metals and alloys, as in forming a mold, for example, to add a suitable bonding clay to silica sand. Water added in moderation thereupon produces a moist, workable mass. Where desired, it has been customary to use a certain amount of burnt or bonded sand in place of a corresponding quantity of clean sand.

The composition thus prepared is suitable for general foundry use. When employed as a mold composition, it is rammed compactly and tightly about a desired pattern which has first been positioned in a molding flask. When so employed, the high strength which is required, particularly in the upper half of the mold, is imparted to the sand by the clay. Dropping, breaking or disintegration of the mold while drawing the pattern or during subsequent handling is effectively prevented. Improved workability of the composition is also imparted by the clay.

Notwithstanding these desirable qualities attributable to the added clay, the presence of a large amount of clay in the composition is not desired. The bonding agent is found to decrease the porosity or permeability of the composition. This permeability, however, is essential in the mold to ensure that the gas evolved when the hot metal contacts the walls of the mold is properly eliminated.

The quantity of clay which must be added, according to the practices heretofore employed, depends upon a number of factors. To illustrate, large work requires a strong, self-sustaining mold. Small light work, on the other hand, can be made with a comparatively weak mold. The type of sand, too, is a factor which must be considered. Sand having smooth, rounded grains requires more bonding material than do sands of rough, irregular grains. Coarse sands require more binder than do sands having fine grains. Where part of the sand comprises burnt or used sand, then less clay is necessary, since some clay is already present in the used material. In general, the amount of bonding agent employed ranges from 5% to 30% by weight of the foundry composition.

The clays heretofore employed for this general purpose are of a number of types. Certain of the non-refractory clays have been found suitable for some classes of work. The use of fire clays and bentonites, however, predominates. These fire clays are largely composed of kaolinite. Clays of the non-refractory type described and suitable for foundry purposes are commonly of glacial age, and contain minerals of the sericite or illite (micaceous) type.

While ready availability in numerous localities throughout this country characterizes both the refractory and non-refractory clays as described, they possess in common the disadvantage that their use is attended by only a comparatively limited increase in the strength of the resulting mold. Accordingly, appreciable increase in strength can be accomplished only by the addition of a substantial quantity of clay to the composition. This substantial proportion of clay, however, is inclined to curtail severely the permeability of the mold. Compromise has heretofore been required between the factors of strength and permeability, the final result not being entirely satisfactory from either standpoint.

It has also been found that western bentonite is well suited as a bonding agent for many types of foundry compositions. High permeability accompanies the use of this clay. Certain disadvantages attend upon its use, however, among which are included its water-swelling propensity and its high dry strength. It rams about the pattern only with difficulty, and has a tendency to swell, cut and scab. Loss of sand in the discarded molds is observed, while cracked castings frequently occur.

In the United States Patent No. 2,180,897, issued November 21, 1939, to Norman J. Dunbeck, southern bentonite is proposed as the binder. Southern bentonite is there described as a non-swelling, colloidal montmorillonite, found in numerous parts of the United States, particularly in the South Central States. Colloidal clay, as the term is there used, indicates a clay largely consisting of fine particles of one micron or less. This southern bentonite, when employed as a foundry binder, gives a mold composition displaying high green strength and a quite moderate dry strength. For this reason, this montmorillonite clay is admirably suited for the binder in molds for making castings of considerable detail. Moreover, the low dry strength permits the castings to contract during cooling without appreciable restraint. Good, sound castings result.

Now foundrymen desire the highest possible green strength in the mold composition, other factors, particularly mold permeance, remaining unimpaired. High green strength ensures faithful reproduction of the detail of the pattern. Moreover, increased green strength permits the use of smaller quantities of bonding agent, thus increasing the permeance of the composition, and resulting in less dead clay and fines in the sand, as well as other advantages which will be apparent to those skilled in the art.

An important object of our invention, therefore, is the production of a foundry composition, together with the art of preparing the same, in which the quantity of bonding agent is appreciably reduced, which composition has high green strength and but moderate dry strength, and which produces good, sound castings of faithful adherence to detail and free from surface defects.

In our co-pending application Serial No. 495,898, filed July 23, 1943, and entitled Foundry composition, we have disclosed treating southern bentonite or suitable refractory clays with boric acid; while in our co-pending application Serial No. 495,899, filed July 23, 1943, and entitled Foundry composition, we have disclosed blending southern bentonite or suitable refractory clays with one or more of the sulphates of calcium. In each instance, the objectives were achieved of increasing appreciably the green strength of a foundry composition in which the new binder was employed, and of enabling the use of a smaller proportion of binder, thus increasing the mold permeance.

We have now made the surprising and important discovery, during the course of our experiments directed to that end, that foundry compositions display even further important increase in green strength when the bonding agent is subjected to appreciable superatmospheric temperatures and pressures, as by autoclaving, over a considerable period of time. Material improvement in green strength over that prior to such treatment is observed both for untreated bonding agents, such as southern bentonite, and for treated binders, such as those described in our two said co-pending applications.

We are by no means certain as to the correct explanation of this advantageous phenomenon. Perhaps some structural change is worked in the clay by the prolonged high pressure and high temperature treatment, due, possibly, to a change in the combined water. Where treating agents also are present, possibly dehydration occurs of the boric acid or calcium sulphate, which in turn might improve the mechanical properties of the clay. Or possibly both such changes might occur simultaneously. It is by no means certain, however, as to what exactly brings about the enhanced properties of the new composition, and we do not desire to be bound by this suggested theory of operation.

In a typical instance of producing a foundry composition in accordance with the practice of our invention, we first subject a bond clay, such as southern bentonite, to autoclaving for about sixty minutes at a pressure of about 300 pounds per square inch. Then to a heap of sand we add about 5% by weight of the autoclaved bond clay, together with a desired amount of water, in this instance 2½% by weight. This water content conveniently may be varied from 2% to 5%, and we have obtained quite good results with a water content ranging between these limits, mixing results in a uniform mix. The mix is then ready for use in preparing a sand mold or for other foundry use, in accordance with well-known methods.

The new mold composition thus produced is easy to handle. It rams firmly and tightly about a pattern and flows freely. The resulting smooth surface of the mold accurately follows the details of the pattern. A durable mold is produced which has a surprisingly high green strength. Consequently, the mold remains firmly in the cope when the pattern is drawn. This mold is characterized by its smooth, unbroken surface and freedom from defects. Required preliminary repair work is reduced to a minimum. Moreover, since only a small quantity of binding agent is required, the mold displays high permeability to the fumes and gases arising when the molten metal is poured into the mold.

Where desirable, we employ as a bonding agent a clay which has been preliminarily treated with from 5% to 30% of boric acid or one or more of the materials selected from the group consisting of anhydrous calcium sulphate, plaster of Paris, or gypsum. In our said co-pending applications, we have disclosed that these treated bonding agents greatly improve the green strength of the resulting composition, as compared with the admixture of southern bentonite alone, and that when boric acid is employed as the additive, there is likewise a marked increase of the dry strength. The clays, treated as noted, then are subjected to autoclaving.

The superior qualities of our novel foundry composition are best illustrated in the following tables. Therein, sample mixes were prepared comprising 95% clean unbonded silica sand with 5% of each bonding agent. Sufficient water was added (2½%) to give a moist mix. The ingredients were mulled in a laboratory muller, and then tested, in accordance with the procedure recommended in the publications of the American Foundrymen's Association. Conveniently, the test data for a bonding agent of southern bentonite are exhibited in the following table:

Table I

| Composition (95% silica sand, with)— | Green compression strength | Dry compression strength |
|---|---|---|
| | Pounds per sq. inch | Pounds per sq. inch |
| 5% southern bentonite | 9.8 | 46.00 |
| 5% south. bent., autoclaved at 50#/sq. in. pressure for sixty minutes | 11.46 | 46.00 |
| 5% south. bent., autoclaved at 100#/sq. in. pressure for sixty minutes | 13.20 | 41.40 |
| 5% south. bent., autoclaved at 200#/sq. in. for sixty minutes | 11.95 | 41.40 |
| 5% south. bent., autoclaved at 300#/sq. in. pressure for sixty minutes | 13.91 | 39.00 |

It will be observed from the foregoing that with southern bentonite alone as the bonding agent the composition subjected to autoclaving displays a substantial increase in green strength over a similar composition in which the treatment has been omitted, together with a notable decrease in dry strength. Permeance is not adversely affected.

Superior qualities, even without special autoclaving, are had with the treated binder of our co-pending application referred to as seen from the following table showing comparative tests on mixes prepared and tested as above:

Table II

| Composition (95% sand, with)— | Green compression strength | Dry compression strength |
|---|---|---|
| | Pounds per sq. inch | Pounds per sq. inch |
| 5% southern bentonite | 9.80 | 46.0 |
| 5% mixture (85% south. bent., 15% boric acid) | 10.5 | 104.0 |
| 5% mixture (85% south. bent., 15% gypsum) | 11.2 | 49.5 |

Additionally superior results are had from foundry compositions employing the treated and autoclaved binders. The sample mixes are made and tested according to procedure given above in connection with the tests of Tables I and II. The test reports are as follows:

Table III

| | | |
|---|---|---|
| 5% mixture: 85% south. bent., 15% boric acid | 10.5 | 104.0 |
| 5% mixture: 85% south. bent., 15% gypsum | 11.2 | 49.5 |
| 5% mixture: 85% south. bent., 15% boric acid autoclaved at 50#/sq. in. pressure for sixty minutes | 15.2 | 96.60 |
| 5% mixture: 85% south. bent., 15% boric acid autoclaved at 100#/sq. in. pressure for sixty minutes | 14.5 | 96.00 |
| 5% mixture: 85% south. bent., 15% boric acid autoclaved at 200#/sq. in. pressure for sixty minutes | 16.4 | 89.70 |
| 5% mixture: 85% south. bent., 15% boric acid autoclaved at 300#/sq. in. pressure for sixty minutes | 16.3 | 88.70 |
| 5% mixture: 85% south. bent., 15% gypsum autoclaved at 300#/sq. in. pressure for sixty minutes | 13.5 | 53.4 |

It also is evident from a consideration of the results of Tables I and III that appreciable variation of the superatmospheric autoclaving pressures can be employed without material variation in the enhanced value of the corresponding green strengths of the compositions employing the autoclaved binders. Within wide range, the autoclaving pressure does not appear to be critical. Satisfactory results have been achieved when pressures even lower than fifty pounds per square inch have been employed. Conversely, no upper limit has been observed as to the pressure which can effectively be employed.

In connection with all compositions, it is noteworthy that increased green strength is accompanied by no decrease in permeability. This is in marked and important contrast with the action of most bonding agents, when increase in dry strength is attended by proportional decrease in permeability. Also, the important advantages are observed that the composition can be mixed faster, and with lower water content. When it is considered that as already stated, the water content is largely responsible for the evolution of gas incident upon pouring the molten metal, the value of diminishing the water content will be appreciated.

When our new composition is employed in the construction of a foundry mold, that mold displays a minor contraction at high temperatures. The formed castings are sound, and free of fins, scabs and similar surface imperfections.

While the proportion of bonding agent to sand has illustratively been given as 5%, we have obtained satisfactory results with from about 2% to about 8% of the binder. Where part of the sand comprises burnt sand, which already contains some clay, and since this clay is reversible in character and can be used over again, we can advantageously extend this lower range to about ½% of bonding agent.

Although southern bentonite either treated or untreated preliminarily in accordance with the practice set forth in our two co-pending applications, has been described as the binder in the illustrative embodiment, other bonding clays may be employed with advantageous results. Thus, we have achieved satisfactory performance where the bonding agent is western bentonite or refractory clays, either untreated or treated with boric acid or sulphates of calcium and thereupon subjected to autoclaving, in accordance with the practice of our invention.

We have described the practice of our invention, for purposes of illustration, largely in connection with a green sand mold. It is particularly to be understood, however, that it is equally applicable to dry sand molds, or green or dry sand cores, or similar foundry constructions. Also, we find it to be applicable to like compositions for other foundry uses. To illustrate, we have prepared facing sands embodying our new composition and consisting of various combinations of new or burnt silica sand, new or burnt molding sand, lake or bank sand, together with the bonding clay, either treated or untreated, and, thereafter, subjected to autoclaving. Additionally, where desired, auxiliary binders have been added in small quantities without departing from the purview of our invention, such as cereal binders, cement, goulac (sulfite lye), pitch or rosin. Materials tending to clean castings have been added, such as sea coal, wood flour or oils. Thus, it will be seen that our new invention provides a new composition, in which the various objects hereinbefore noted are all achieved, together with many thoroughly practical advantages. Our new foundry composition is of high green strength, of good permeance, and of controlled dry strength. It is well adapted to withstand the many varying conditions of actual operational use in many applications.

As many possible embodiments may be made of our invention and since many changes may be made in the embodiments hereinbefore set forth, it is to be understood that all matter described herein is to be interpreted illustratively and not in a limiting sense.

We claim:

1. In preparing a foundry binder, the art which comprises treating a bonding clay with about 5% to 30% by weight of calcium sulphate and subjecting the treated clay to autoclaving at superatmospheric pressures for an appreciable period of time.

2. In preparing a foundry binder, the art which comprises treating bentonite with calcium sulphate and then autoclaving the treated bentonite at a pressure between about 50 pounds per square inch and 300 pounds per square inch for approximately one hour or more.

3. In preparing a composition of matter for foundry uses, the art which comprises treating a bonding clay with calcium sulphate, subjecting the same to autoclaving, and mixing with silica sand about ½% to about 8% by weight of the treated and autoclaved clay.

ARNOLD E. PAVLISH.
CHESTER RONALD AUSTIN.